United States Patent [19]
Glaise et al.

[11] Patent Number: 6,097,725
[45] Date of Patent: Aug. 1, 2000

[54] LOW COST SEARCHING METHOD AND APPARATUS FOR ASYNCHRONOUS TRANSFER MODE SYSTEMS

[75] Inventors: Rene Glaise, Nice; Jean-Marie Munier, Cagnes sur Mer, both of France

[73] Assignee: International Business Machines Corporation, Armonk, N.Y.

[21] Appl. No.: 09/061,370

[22] Filed: Apr. 16, 1998

[30] Foreign Application Priority Data

Oct. 1, 1997 [EP] European Pat. Off. .............. 97480019

[51] Int. Cl.[7] ................................................... H04L 12/56
[52] U.S. Cl. ........................ 370/395; 370/392; 711/216; 714/781
[58] Field of Search ..................... 370/389, 392, 370/397, 399, 471, 395, 393; 711/202, 203, 216; 714/781, 776, 758, 807, 752, 748, 750, 745, 792

[56] References Cited

U.S. PATENT DOCUMENTS

| | | | |
|---|---|---|---|
| 4,588,985 | 5/1986 | Carter et al. ............................ | 340/347 |
| 5,199,073 | 3/1993 | Scott ......................................... | 380/49 |
| 5,689,518 | 11/1997 | Galand et al. .......................... | 371/37.1 |
| 5,740,171 | 4/1998 | Mazzola et al. ....................... | 370/392 |
| 5,912,881 | 6/1999 | Glaise et al. ............................ | 370/252 |
| 6,014,767 | 1/2000 | Glaise ..................................... | 714/776 |
| 6,034,958 | 3/2000 | Wicklund ................................ | 370/395 |

*Primary Examiner*—Douglas W. Olms
*Assistant Examiner*—Ken Vanderpuye
*Attorney, Agent, or Firm*—Gerald R. Woods

[57] ABSTRACT

A method and an apparatus for searching a bit field whose significant bits comprise two contiguous bit fields such as the VPI/VCI bit fields of an ATM cell header. The invention uses a hash key based on CRC-n calculated on the bit field to be searched. One m bit field part of the significant bits of the bit field to be searched can be concatenated with the CRC-n to form a double hash key. It appears that, L being the total of the two contiguous bit field lengths, if $L=m=n+p$, p being greater or equal to 4, the scattering of data to be searched is perfect. The method comprised a first step of pointing to a first address with the hash (or double hash) key and reading a maximum of $2^p$ addresses before reaching the addresses containing the bit field to be searched.

8 Claims, 17 Drawing Sheets

| 40-bit input vector (ATM header) | | | H |
|---|---|---|---|
| .11.1.....1.1 | .11.1.1.1...111. | ..... 1....... | 1.......→ |
| ..11.1.....1. | 1.11.1.1.1...111 | ..... .1...... | .1......→ |
| 1..11.1.....1 | .1.11.1.1.1...11 | 1.... ..1..... | ..1.....→ |
| 11..11.1..... | 1.1.11.1.1.1...1 | 11... ...1.... | ...1....→ |
| .11..11.1.... | .1.1.11.1.1.1... | 111.. ....1... | ....1...→ |
| ..11..11.1... | ..1.1.11.1.1.1.. | .111. .....1.. | .....1..→ |
| .111....11111 | .1111111..1..1.. | ..11 ......1. | ......1.→ |
| 11.1......1.1. | 11.1.1.1...111.. | ...1 .......1 | .......1→ |
| 11 VPi 0 | 15 VCi 0 | 7 HEC 0 | |

Result of Generation or Checking

| HEC | x'00' | . | . | . | . | . | . | . | . | . | . | . | . | . | . | . | . | . | . | . | . | . | . | . | . | . | . | . | . | . | . | x'1F' |
|---|---|---|---|---|---|---|---|---|---|---|---|---|---|---|---|---|---|---|---|---|---|---|---|---|---|---|---|---|---|---|---|---|
| x'0' | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| x'1' | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| x'2' | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| x'3' | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| x'4' | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| x'5' | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| x'6' | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| x'7' | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIGURE 4

$0 \leq S0 \leq 24$, $0 \leq S1 \leq 8$, $0 \leq S2 \leq 24$, $S3 = 8-S1$ and $S0+S1+S2+S3 \leq 32$.

| TOTAL OF 2 BIT SUBFIELD LENGTH | 8 | 9 | 10 | 11 | 12 | 12(*) | 13 | etc |
|---|---|---|---|---|---|---|---|---|
| Number of combinations | 256 | 512 | 1024 | 2048 | 4096 | 4096 | 8192 | ...... |
| Minimum Row Space | 5 | 6 | 6 | 7 | 7 | 8 | 8 | ...... |
| Imperfect mapping | $2^3$ | $2^2$ | $2^2$ | $2^1$ | $2^1$ | 1 | 1 | ...... |
| Cluster bound (Max nb of keys mapping at the same add) | 8 | 8 | 16 | 16 | 32 | 16 | 32 | ...... |

FIGURE 6

| HEC | x'0' | . | . | . | . | . | . | . | . | . | . | . | . | . | . | x'F' |
|---|---|---|---|---|---|---|---|---|---|---|---|---|---|---|---|---|
| x'0' | 16 | 16 | 16 | 16 | 16 | 16 | 16 | 16 | 16 | 16 | 16 | 16 | 16 | 16 | 16 | 16 |
| x'1' | 16 | 16 | 16 | 16 | 16 | 16 | 16 | 16 | 16 | 16 | 16 | 16 | 16 | 16 | 16 | 16 |
| x'2' | 16 | 16 | 16 | 16 | 16 | 16 | 16 | 16 | 16 | 16 | 16 | 16 | 16 | 16 | 16 | 16 |
| x'3' | 16 | 16 | 16 | 16 | 16 | 16 | 16 | 16 | 16 | 16 | 16 | 16 | 16 | 16 | 16 | 16 |
| x'4' | 16 | 16 | 16 | 16 | 16 | 16 | 16 | 16 | 16 | 16 | 16 | 16 | 16 | 16 | 16 | 16 |
| x'5' | 16 | 16 | 16 | 16 | 16 | 16 | 16 | 16 | 16 | 16 | 16 | 16 | 16 | 16 | 16 | 16 |
| x'6' | 16 | 16 | 16 | 16 | 16 | 16 | 16 | 16 | 16 | 16 | 16 | 16 | 16 | 16 | 16 | 16 |
| x'7' | 16 | 16 | 16 | 16 | 16 | 16 | 16 | 16 | 16 | 16 | 16 | 16 | 16 | 16 | 16 | 16 |
| x'8' | 16 | 16 | 16 | 16 | 16 | 16 | 16 | 16 | 16 | 16 | 16 | 16 | 16 | 16 | 16 | 16 |
| x'9' | 16 | 16 | 16 | 16 | 16 | 16 | 16 | 16 | 16 | 16 | 16 | 16 | 16 | 16 | 16 | 16 |
| x'A' | 16 | 16 | 16 | 16 | 16 | 16 | 16 | 16 | 16 | 16 | 16 | 16 | 16 | 16 | 16 | 16 |
| x'B' | 16 | 16 | 16 | 16 | 16 | 16 | 16 | 16 | 16 | 16 | 16 | 16 | 16 | 16 | 16 | 16 |
| x'C' | 16 | 16 | 16 | 16 | 16 | 16 | 16 | 16 | 16 | 16 | 16 | 16 | 16 | 16 | 16 | 16 |
| x'D' | 16 | 16 | 16 | 16 | 16 | 16 | 16 | 16 | 16 | 16 | 16 | 16 | 16 | 16 | 16 | 16 |
| x'E' | 16 | 16 | 16 | 16 | 16 | 16 | 16 | 16 | 16 | 16 | 16 | 16 | 16 | 16 | 16 | 16 |
| x'F' | 16 | 16 | 16 | 16 | 16 | 16 | 16 | 16 | 16 | 16 | 16 | 16 | 16 | 16 | 16 | 16 |

Figure 7

BLOCK CURRENT ADDRESS = BCA

FIGURE 12

12 bit hash table address

FIGURE 14

| | | 12 | 13 | 14 | 15 | 16 | 17 | etc |
|---|---|---|---|---|---|---|---|---|
| Number of columns (split in any 2 subfields) | | | | | | | | |
| Number of combinations | | 4096 | 8192 | $2^{14}$ | $2^{15}$ | $2^{16}$ | $2^{17}$ | ...... |
| Minimum Row Space | | 10 | 10 | 11 | 11 | 12 | 12 | ...... |
| Imperfect mapping | | 4 | 4 | 2 | 2 | 1 | 1 | ...... |
| Cluster bound (Max nb of keys mapping at the same add) | | 4 | 8 | 8 | 16 | 16 | 32 | ...... |

FIGURE 15

LOW COST SEARCHING METHOD AND APPARATUS FOR ASYNCHRONOUS TRANSFER MODE SYSTEMS

FIELD OF THE INVENTION

This invention relates to techniques for searching large bit fields at very high speeds. The invention can be applied to Asynchronous Transfer Mode (ATM) network adapters in which 28 or 24 bit fields of ATM cell headers are to be searched particularly during an available cell processing time of 2.7 microseconds or 0.7 microseconds corresponding, respectively, to 155 Mbps or 622 Mbps ATM link speeds.

BACKGROUND OF THE INVENTION

Network adapters in network switching nodes are used to connect the network physical links to the node's switch element. With current electronic technology it is hard to implement low cost searching functions in the adapters when the bit fields to be searched are large and the processing time must be limited in order to sustain the high network link media speeds.

The trend today is to use Asynchronous Transfer Mode as high speed transmission and switching communication networks. In ATM networks, all data are transported in cells and each cell is 53 bytes long. The first five bytes contain a header for identification of the cell. Particularly, the header contains a VPI/VCI (Virtual Channel Identifier/Virtual Path Identifier) field conforming to the ITU-T standardization of the 'integrated services digital network (B-ISDN)' I.361, last update 11/95. A contiguous field of 128 addresses encoded in 7 bits could, following the I.361 recommendation, be in a range of 128–255 or 1024–1151 or any contiguous field for which the seven least significant bits range from 0 to 127. The length of the VPI/VCI field of the ATM cell header is either 24 bits or 28 bits depending on the type of interface (User Network Interface or Network Node Interface). Each VPI/VCI field identifies a virtual connection that the cell belongs to. The I.361 recommendation requires that the bits allocated to the VPI and VCI bit field be contiguous.

In ATM networks connections are defined from one end of the network to the other end but, the VPI/VCI connection identification has only local significance between any two nodes. As a consequence, for routing of an ATM cell received at an input link port of a switching node, the VPI/VCI field is read and replaced (swapped) by a new field retrieved from a table stored in the node. A routing tag is attached so that the cell can be routed through the switch. After switching, the routing tag is removed and the cell is transmitted on proper outgoing link with the new VPI/VCI field. For routing each cell, the VPI/VCI bit field of the cell header is read and a table is searched for a match. The match entry contains the matched VPI/VCI field and the new VIP/VCI field or a pointer towards this final field. The table search has to be efficient because in adapters handling high speed links have limited cell processing time. The network manager also accesses the table for creating and deleting entries at each creation or deletion of a connection. Efficient table searches are important when updates are being made as well as when the table is being used for routing.

It is not realistic to create a table having as many stored entries as the number of possible combinations of the VPI/VCI field because for a VPI/VCI field of 28 bits, there are $2^{28}=268\times10^6$ possible combinations. However, according to the ITU specifications referenced above, the VCI and VPI bit fields are continuously allocated. The continuous bit allocation for VPI or VCI can be any part of the respective 8/12 and 16 bit fields. The bit allocation is negotiated between the user and the network manager at connection setup. That is why the search function should cover any of the possible combinations of 24/28 bits. In practice, the number of entries used is the number of simultaneous connections supported by the adapter. Typically about 2000 connections per link and about 4 high speed links are supported by an adapter, giving a total of 8000 connections or table entries per adapter. Consequently, one alternative to maximum table of $2^{24}$ or $2^{28}$ entries, would be a table of 8000 entries to be sequentially read each time a cell header is swapped. This solution is inefficient because of the poor performance of a sequential searching operation.

One conventional way of achieving high speed searching of large bit fields by using a CAM (Content Addressable Memory) hardware device. CAM components are available in the networking industry and operate as follows. A key is given as an input and the result of the search is provided in a time quite acceptable for high speed ATM cell processing. However, current CAM components have typically only 1 k entries and are very expensive.

To reduce costs, a solution taught in European patent application EP 94480033.3 is to use three or more cascaded DRAM storage units as a 'pseudo-CAM', using parts of the initial bit fields combined with the result read in a previous table as a key to the next table. This solution implies the use of at least 3×16 Mbit DRAM storage units for handling 8000 simultaneous connections. The cost of such a 'pseudo-CAM' to implement a search function, although lower than a conventional CAM, must be further reduced to be satisfactory for use in network adapters.

One other solution for an efficient searching function is to use a binary tree based search or hash function. A problem of binary trees is that they are difficult to manage. The DELETE and CREATE entry operations are much too complex. When using a hash function f, for a given entry address to be searched, E (in our case a $2^{24}$ or $2^{28}$ bit field address) is associated with a computed key, f(E), which is used as the table address which is pointed to and from which a second search begins among a subset of addresses. A good hash function is one which has a simple key computation and which splits the original addressed to be searched into bounded, non-intersecting subsets of addresses of about the same size. These conditions are described as producing no clustering of data. Volume 3 of the publication 'The Art of Computer Programming' of Donald E. Knut, Addison Wesley Publishing Company, 1973, page 513, suggests that the computation of the hash key comprise algebraic operations instead of arithmetic operations. The hash key could be obtained by dividing the initial address polynomial representation by a polynomial modulo 2. At page 519 of the same publication, it is also suggested a sequential search be made in the subsets selected by the hash key. When trying to find the address corresponding to the entry address E, the key f(E) is computed with the hash function and the first entry address is read sequentially until either finding the entry address E or finding an empty position. This 'linear probing' scheme is however only practicable if there is no clustering of data.

It is an object of the invention to provide a low cost method and device for implementing a searching function where processing time is limited.

It is a second object of the invention to have simple, efficient management of address entries to allow simple deletion and addition of stored values, for instance, connection VPI/VCI values in the case of ATM processing.

A third object of the invention is to provide a solution that can be implemented either as hardware or software. In the example of the ATM adapter, the search function could be a hardware-assisted implementation or a software application operating on a processor already programmed to perform other software functions in the adapter.

SUMMARY OF THE INVENTION

The objects of the invention are attained by a method for searching a N bit field address, N being an integer greater than zero, where the N bit field address comprises one of two contiguous bit sub-fields whose cumulative length is an integer L. Three integers n, m and p are chosen to satisfy the conditions that n be greater than zero, p be equal or greater than 4, and L=m+n+p. The N bit field address is read and the remainder of polynomial division of the polynomial representation of said N bit field, the polynomial coefficients being zero or one, by a multiplying group polynomial generator of degree n is computed. A hash key is chosen based on the computed remainder bit field and m bits of the N bit field. The hash key is used to point to a first address corresponding to said hash key among $2^{m+n}$ addresses. Sequential reading of the next $2^p$ entries is performed until the address read matches the N bit field address.

The addresses stored at the entry point address provided by the hash form a bound subset of addresses. This implies that there is no clustering of data. The subset is read sequentially until the entry address, an empty position or the last entry of the subset is encountered. To create an address a network manager fills the first empty position. To delete an address, the network manager tags the address slot with a 'void' indicator.

The hash key computation is based on polynomial division operations implemented with simple XOR operations. For an ATM cell, the key used is the Header Error Check (HEC) field of the ATM cell header. This value is available in the cell without need of additional computation except for an alteration of the HEC to suppress the effect of GFC and PTI/CLP values which are stored in the other fields of the ATM cell header. The storage required is reduced compared to the solution of the prior art. In one implementation, only 22 kilobytes were required in a standard RAM storage unit for managing four thousand simultaneous connections.

BRIEF DESCRIPTION OF THE DRAWINGS

FIG. 1 shows the matrix form of a CRC-8 computation.

FIG. 2 shows the matrix H comprising two submatrices of the matrix of FIG. 1 and the echelon canonical from H' of matrix H.

FIG. 3 is a table all the HEC values for VPI [0–2] and VCI [8–12].

FIG. 4 is a table showing the scattering of data for all the HEC values for VPI [0–3].

FIG. 6 illustrates the scattering of data with CRC-8 hash key.

FIG. 7 is a table showing the scattering of data for all the HEC values for VPI/VCI bit field length of 12.

FIG. 12 is the matrix used for masking the effect of the non VPI/VCI bits in the ATM cell header HEC.

FIG. 14 shows the CRC-12 calculation matrix.

FIG. 15 illustrates the scattering of data according to the total of two contiguous bit field lengths when the hash key is the CRC-12.

DETAILED DESCRIPTION OF THE PREFERRED EMBODIMENT

Figure 5:
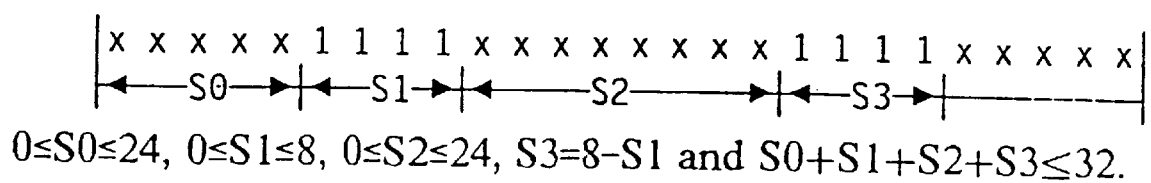
FIG. 5 illustrates all the possible VPI/VCI bit fields for a total 8 bits.

In accordance with the invention, a search is performed based on a hash key computed using operations in the algebra of the modulo 2 polynomials (the coefficients are 0 or 1). The generator polynomial of the algebra multiplying group is chosen in such a way that the scattering of addresses is uniform, implying no clustering of the addresses. In this case, when pointing to a first address using the hash key, the set of addresses to be searched is bounded. With this solution of the invention, the search in the subset leads to an empty address slot if there is no match. The solution of the invention is possible if the bit field to be searched comprises one or two contiguous bit fields having specific lengths: the total of VPI+VCI field length exceeds at least by 4 the degree of the generator polynomial. When applied to an ATM VPI/VCI field, the solution of the invention would imply that these fields follow the I.361 ITU recommendation; the constraint of VPI/VCI bit field specific lengths correspond to the characteristics of the ATM adapter implementing the corresponding search function. As an example given later in this description, an adapter able to support link speeds up to 622 Mbps may support up to four thousand simultaneous connections if the VPI/VCI bit fields are two contiguous bit fields having a total of 12 and using 173 Kbits of RAM storage.

Taking the example of the search function for the ATM cell forwarder layer, the ATM cell header of 40 bits comprises 8 bits for error checking, the Header Error Check (HEC) field based on the CRC-8 (cyclic redundancy check) code calculated on the first 32 bits of the header completed with 8 zeros. The CRC-8 code is the remainder of the division of polynomial representation of the header completed with zeros bit field by the generator polynomial of degree 8; that is, $G(X)=X^8+X^2+X+1$ Bit streams can be represented as polynomials having coefficients values of 0 or 1, each power of X representing the weight of the bit in the stream. The CRC-8 codes belong to the algebra of modulo 2 polynomials multiplying group generated by the generator polynomial. The well known polynomial computations are implemented via logical addition (XORs) based on their coefficients. Standard circuitry for computing the CRC of a bit stream message is a Linear Feedback Shift Register (LFSR) which carries out a bit by bit multiplication in the corresponding algebra of the modulo 2 polynomials multiplying group. Each bit of the message is pushed in the LFSR, most significant bit (MSB) first. The division is performed by the feedbacks. At the end, the CRC process concatenates the remainder of the division which is within the shift register. This method and type of circuitry is described, for instance, in 'Error Checking Codes' by Peterson and Weldon, the MIT Press, 2nd edition, 1972.

The CRC-8 code computation is better represented by a vectorial multiplication by a 40×8 matrix. FIG. 1 is a representation of the matrix corresponding to the generator polynomial of degree 8. To compute the HEC bits or to check the header for correctness, the 40 bit input vector (the 8 HEC bits being preset to 0 in generation), must be multiplied by the 40×8 matrix of FIG. 1 (inner product) the result being an 8 bit vector. To conform with the ATM standard, a fixed value B'01010101' is added to the HEC after it has been computed with the matrix of FIG. 1. This generator polynomial of degree 8 has been chosen by the ATM Forum for ATM cell header error checking. In FIG. 1 the VPI/VCI fields examples correspond to the I.361 NNI recommendation as the VPI field is a 12 bit field.

Figure 2:
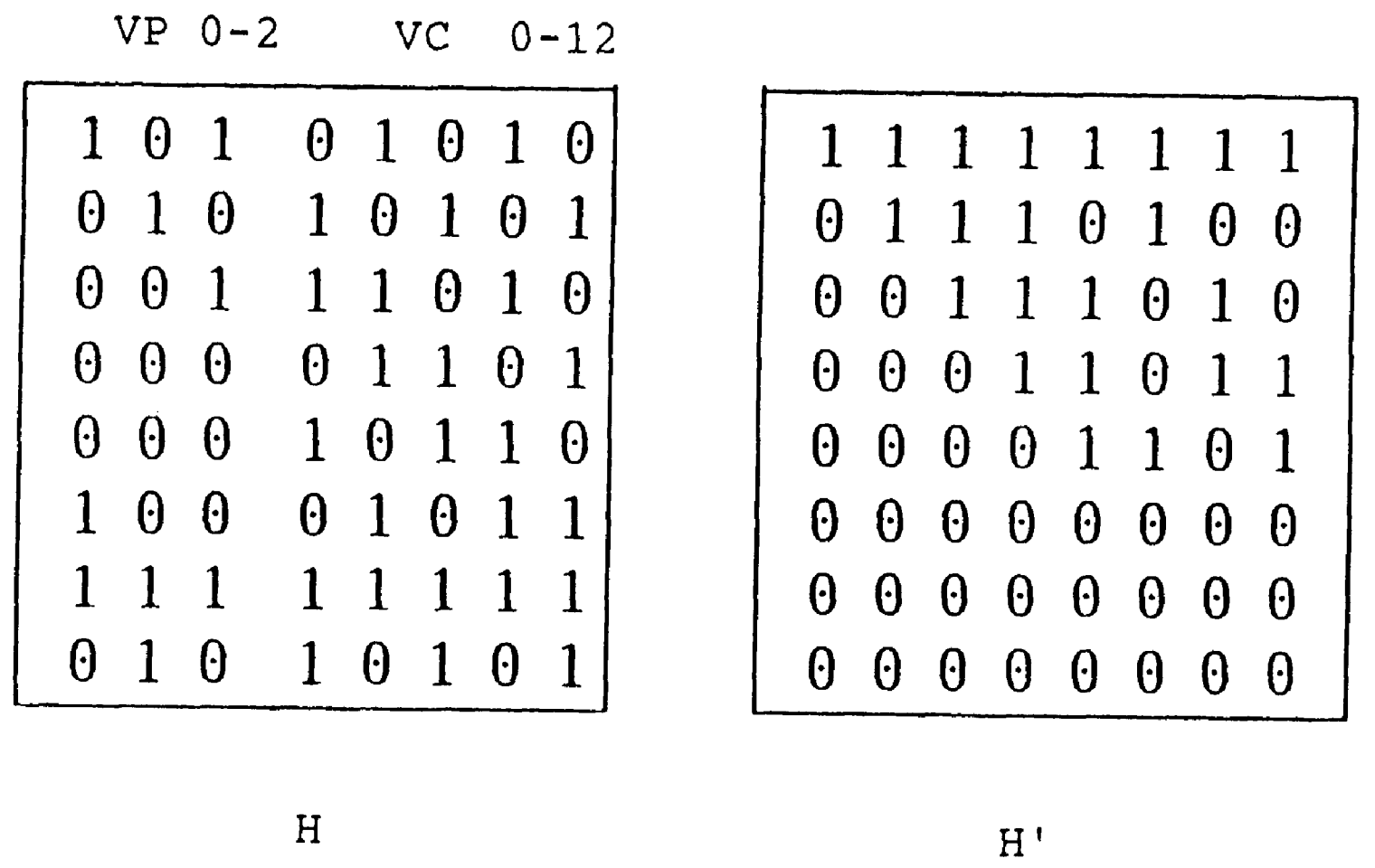
Figure 3:
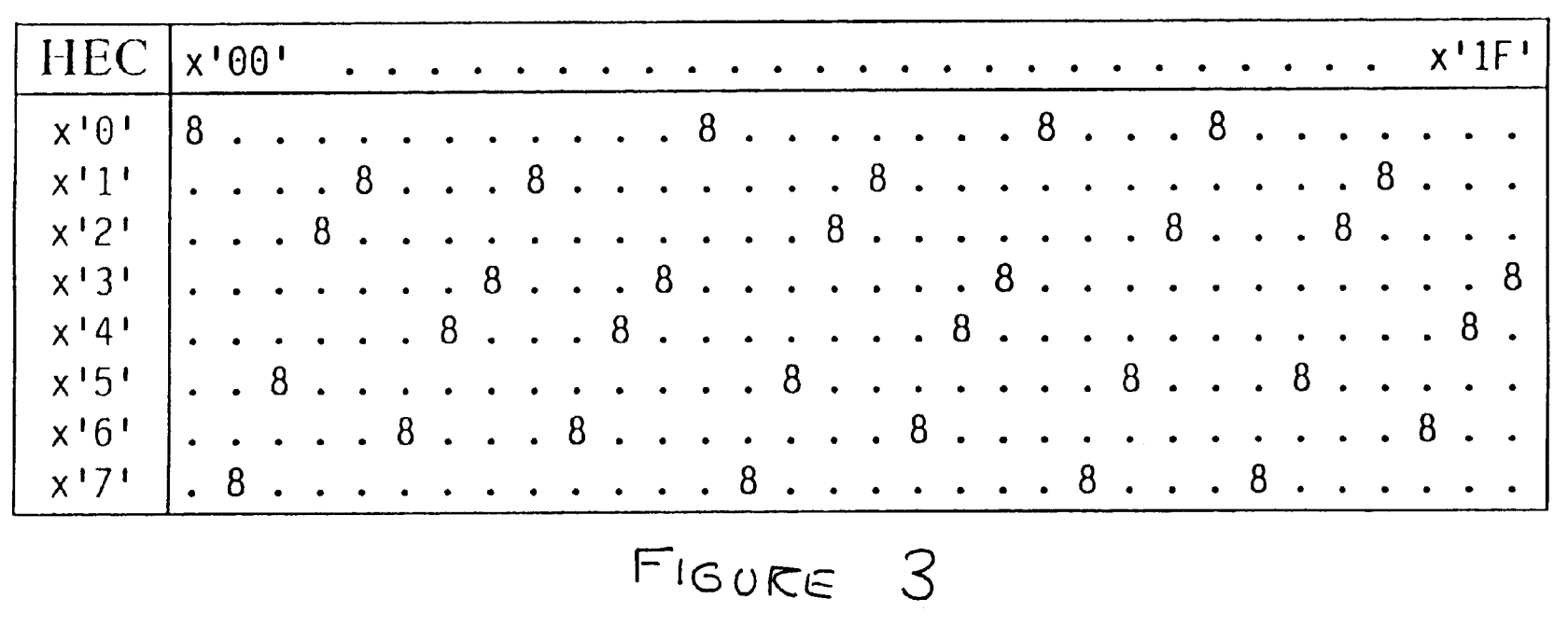

As a first example of the method, two contiguous bit fields are chosen for a total of 8 bits among the 32 first bits of the ATM cell header (the remaining 8 bits being the HEC). Choosing these bit fields is equivalent of taking two submatrices of the CRC-8 matrix of FIG. 1. For instance, the submatrix H of FIG. 2 is based on the significant bits of the VPI/VCI fields which are, respectively, 0 to 2 bits of the VPI (VPI [0–2]) bit field concatenated to the five bits 8 to 12 of the VCI field (VCI [8–12]). Each column of the submatrix corresponds to the useful bits taken from the VPI/VCI bit field. When one calculates the echelon canonical form H' of the submatrix H, there are some rows set to zero and the 'minimum row space' is set to 5. As there are some rows set to zero, one says that the submatrix H is singular. FIG. 3 represents the various HEC values which are the hash key values taken in this first embodiment, in the form of a table where the 3 first bit values of the HEC (from '000' to '111') are on the vertical axis and the last 5 bit values of the HEC (from '00000' to '11111') are on the horizontal axis. The 256 (number of possible different 8 bit fields) values stored are the number of VPI/VCI bit fields having the same HEC value as the hash key. The values stored in the table are the number of 'collisions'. In a table of FIG. 3 which is based on the submatrix just identified for VPI [0–2] and VCI [8–12], the HEC values used as a hash key are indicated with a number 8, the other HEC values being unused. The consequence for the searching with such a clustering is that all the addresses are stored in a limited number of entries. Each non-empty entry stores up to eight different addresses. This means that after pointing to the HEC hash key address, up to eight values could be read sequentially before reaching the correct address. In this example, there is a clustering of data which implies a lack of efficiency of this searching method.

To the contrary, FIG. 4 illustrates the 256 possible values of the HEC hash key calculated for two other contiguous bit fields, VPI [0–3] and VCI [0–3]. The table of FIG. 4 illustrates a perfect scattering of data because each value of the HEC hash key points to a unique VPI/VCI bit field value. The searching process time is minimum (one pointing and one read operation), the HEC being already calculated for ATM. The submatrix H' for the example of FIG. 4 is a nonsingular matrix. This is the ideal scattering of data where each HEC value is useful and corresponds to one entry.

All the possible submatrices of the CRC-8 matrix correspond to all the possible VPI/VCI bit fields, these fields being contiguous and having a total of 8 bits in the first 32 bit field of the ATM cell header. All the possible bit fields are illustrated in FIG. 5. S1, in this example is the length of the first useful bit field of the VPI field. S3 is the length of the useful bit field of the VCI bit field. If all the submatrices are tried, it appears that every submatrix formed from a single contiguous set of column is nonsingular. This means that when choosing VPI/VCI subfields so that the bits are contiguous, the scattering of data is optimal, each HEC value is useful and corresponds to one entry. All these submatrices correspond to a scattering of the HEC field such as the one of FIG. 4. It is also the recommendation of the I.361 standard which calls for two contiguous bit fields among the VPI (8 or 12 bits) and VCI (16 bits) fields starting from the least significant bits.

From this first example of the invention, it appears that if the contiguous fields follow the I.361 recommendation, the HEC taken as a hash key results in either a perfect scattering of the VPI/VCI field addresses (1 address per each of the 256 entries) or in the worst case a maximum clustering of 8 values per HEC hash key value. For this first example with the 8 bit HEC taken as the hash key, the maximum number of simultaneous connections supported is $2^8=256$. It is normally necessary to support more connections. One adapter can support up to 8 k simultaneous connections in the case where it supports 4 links having each 2000 simultaneous connections.

In a second embodiment, the searched field length is increased beyond eight in order to support more than 256 simultaneous connections. If the two contiguous bit fields have a total of twelve bits, there will be $2^{8+4}=2^{12}=$ four thousand possible combinations and thus four thousand possible simultaneous connections. Trying all the possible submatrices of a total of twelve columns leads to perfect scattering of data into four thousand entries of sixteen addresses each. An exception for the twelve bit fields is not to use the most significant bit in (bit 15) of the VCI field in the range of two contiguous bit fields.

FIG. 6 provides all the total VPI/VCI bit field lengths and the corresponding results for the scattering of data. It appears that using the HEC as a hash key leads to a perfect scattering of data if the total VPI/VCI bit field length is at least twelve. The scattering of date for total VPI/VCI bit field length of twelve is illustrated in FIG. 7. Each of the 4096 entries can store up to sixteen addresses. As can be read in the table of FIG. 6 for 8192 simultaneous connections and a VPI/VCI bit field length of 13, if the HEC is taken as the hash key, the data will be searched in 8192 entries of 32 addresses each. The 'minimum row space' row of the table in FIG. 6 is the number of non-zero columns of the echelon canonical form of the submatrices corresponding to the chosen total VPI/VCI bit field length. The 'cluster bound' row of the table of FIG. 6 represents the maximum collisions with the HEC hash key. It is the maximum number of entries to read before reaching a match. The 'imperfect mapping' row of the same table in FIG. 6 represents the ratio M/m, M being the cluster bound and m being the minimum collisions found for some same values of the HEC hash key. As illustrated in FIG. 7 described above, the ratio M/m is always 1 for a total VPI/VCI bit field length of 12. It is noted that the best value are with a perfect scattering providing an 'imperfect mapping' value of 1 such as with a total VPI/VCI bit field length of 12 and 13; in these two cases, each entry pointed with the HEC hash key stores respectively 16 and 32 values which are the maximum values to be searched. The VPI/VCI bit field length of 13 will be adapted for 8192 simultaneous connections on links of 155 Mps because, in this case, with the maximum of 32 read operations in storage RAM units of current technology, the searching time does not exceed the 2.7 microsecond limit required in support of 155 Mps operation. To be precise, as indicated in the table of FIG. 6, with a VPI/VCI bit field length of 12, a single 12 bit field gives a row space of 7. As stated in column 12 the 'minimum row space' is 7. However, if the corresponding bit fields avoid using the VCI most significant bit (15), the mapping is perfect, this is indicated in column 12 (*) of the table of FIG. 6. Consequently, the VPI/VCI bit field length of 12 (*) (if bit 15 of VCI field is not used) will be adapted for four thousand simultaneous connections for a link speed of 622 Mps because the maximum of 16 read operations in storage RAM units of current technology does not require searching time exceeding the limit of 0.7 microseconds.

Figure 8:
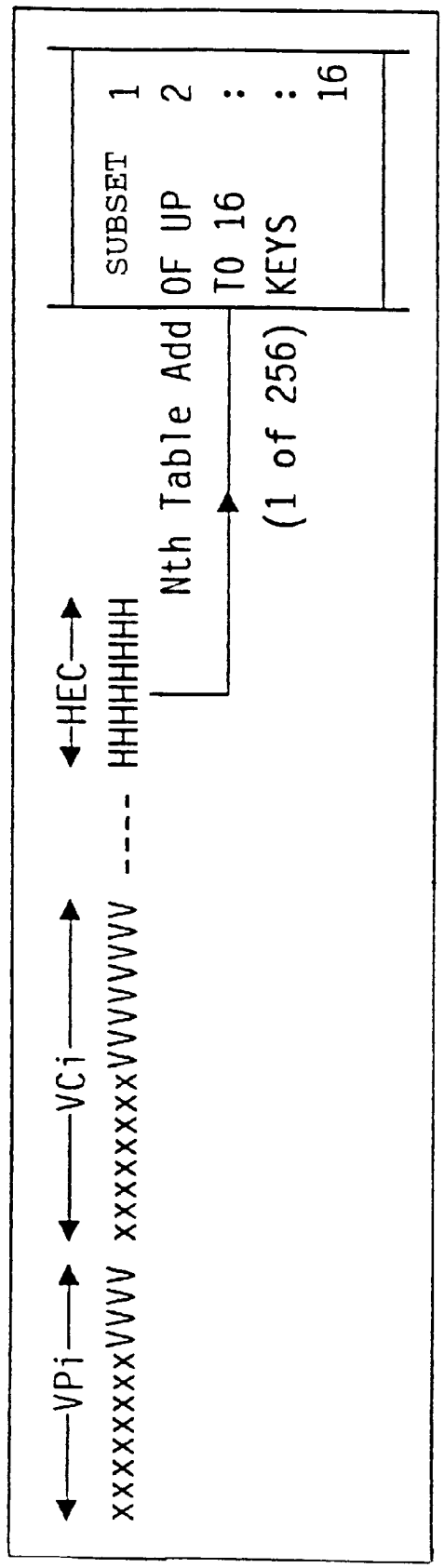
FIG. 8 shows the HEC hash key process for ATM.

FIG. 8 illustrates the searching operation based on the HEC hash key for ATM cell headers. The VVV fields are the selected contiguous bit fields starting at the least significant fit which are to be searched. In this case the total VPI/VCI is not used, the scattering of the values is perfect into 256 subsets of 16 stored values (see column 12 (*) of the table of FIG. 6. As a matter of fact, the hash key being the HEC, there are $2^8=256$ possible values for the HEC (CRC-8) and thus 256 entries in the table storing the possible VPI/VCI values. After pointing with the HEC hash key, a maximum of 16 values are read before finding the VPI/VCI to be searched.

The resulting bit field length leading to a perfect scattering of data when using the CRC-8 of the searched field as a hash key can be extended to any CRC-n. It appears, when trying all the possibilities, that choosing generator polynomials of degree n to calculate the CRC-n of two contiguous bit fields, the scattering of data becomes perfect when the total of the two contiguous bit field lengths is equal or greater than n+4. Using a value of n greater than 8 would support more connections. For instance, with n=12, and CRC-12 codes used as hash keys, the perfect scattering of data is obtained with a total of the two contiguous bit field lengths of 12+4=16 and over. This leads to a support of $2^{16}$ and over. For an ATM adapter implementing this searching function in its ATM forwarder layer, this means that the adapter can support at least $2^{16}$ simultaneous connections. The table of FIG. 15 shows the result obtained when a CRC-12 is used as hash key. When the contiguous bit field lengths is 16 and over, the 'imperfect mapping' row values are always 1, meaning that there is a perfect scattering of data in subsets of 16 entries (for 16) and over (see the 'Cluster bound' row). In summary, increasing the degree of the polynomial generator for calculating the hash key is a good way of supporting two contiguous bit fields of greater length; this means, in ATM adapters, supporting more simultaneous connections identified by the VPI/VCI contiguous bit fields.

It is noted also that the results presented in FIG. 15 are obtained with a CRC-12 computation obtained with a specific polynomial generator or degree 12:

$$G(16533)=X^{12}+X^{11}+X^{10}+X^8+X^6+X^4+X^3+X+1$$

Figure 14:
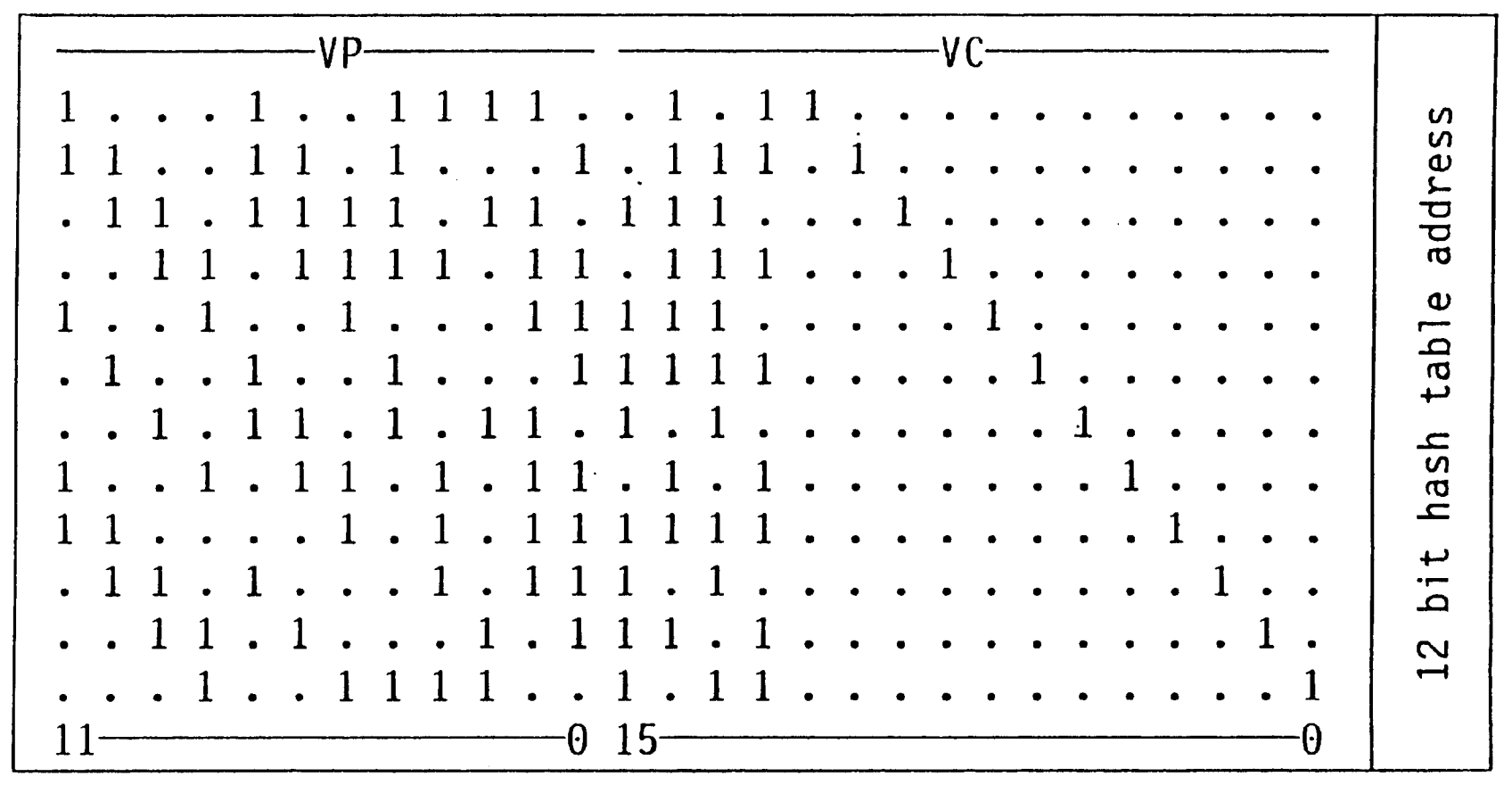

The matrix for calculation of CBC-12 based on G(16533) is shown in FIG. 14. A CPI/VCI field value entered is multiplied by the matrix, the result being a 12 bit vector used as hash key. All the submatrices formed of two subfields of continuous columns are analyzed, the results being shown in FIG. 15. It appears that when trying successive polynomial generators of degree greater than 8, the best results for the scattering of data bounded in subsets of limited size are obtained with G(16533) which is an irreducible, primitive polynomial modulo 2 having its roots linearly independent. G(16533) is a H type polynomial. Also it appears that better results are obtained if G or H type polynomial from the list of the 'Error Checking Codes' by Peterson and Weldon, the MIT Press, 2nd edition, 1972, are chosen.

Figure 16:
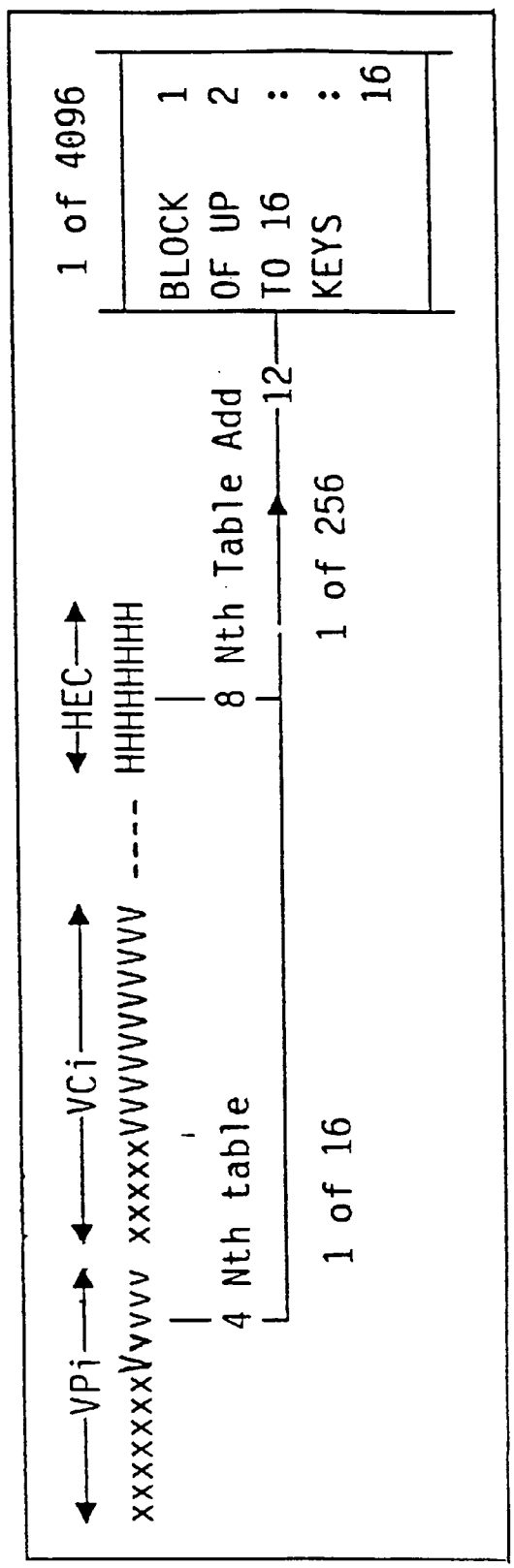
FIG. 16 illustrates the double hash key based on CRC-8 plus four bits starting from the least significant bit of the VPI field.

There is one other way of supporting searching of two contiguous bit fields of a total greater length which means for ATM adapter implementing this searching function, supporting more simultaneous connections. This is an extension of the first embodiment of the invention using the CBC-n as the hash key. The solution is to use a double hash key based on the CBC-n extended with some (m) bits from one contiguous bit field starting from the least significant bits (assume bit field modulo $2^n$). Any m bits of one of the two contiguous bit fields even if these m bits do not form a contiguous bit field, can be taken. This leads, for instance, when using CBC-8 as a first part of the double hash key (n=8), to multiplying $2^8=256$ subsets by $2^n$ input. Taking the VPI field modulo 16 and CBC-8 as double hash key, for a VPI/VCI total bit field length of 16, support is provided for up to $2^{16}=64k$ entries with the same results as for the scattering of data and the process time that can be read in the column 12 (*) of FIG. 6. The double hash key process is described in FIG. 16 where the 4 first bits of the VPI bit field (vvvv) and the HEC (HHHHHHHH) are both used to form a double hash key. The VCI bit field is 5 bits and the VPI bit field is 11 bits for a VPI/VCI total bit field length of 16 bits. The average successful search requires (16+1)/2=8.5 read operations which is the same than when CBC-8 is taken as the hash key (results of the table in FIG. 6). Coming back to FIG. 16, the table of VPI/VCI values contains 4096 subsets of 16 values and thus stores a total of 64k values.

Figure 12:
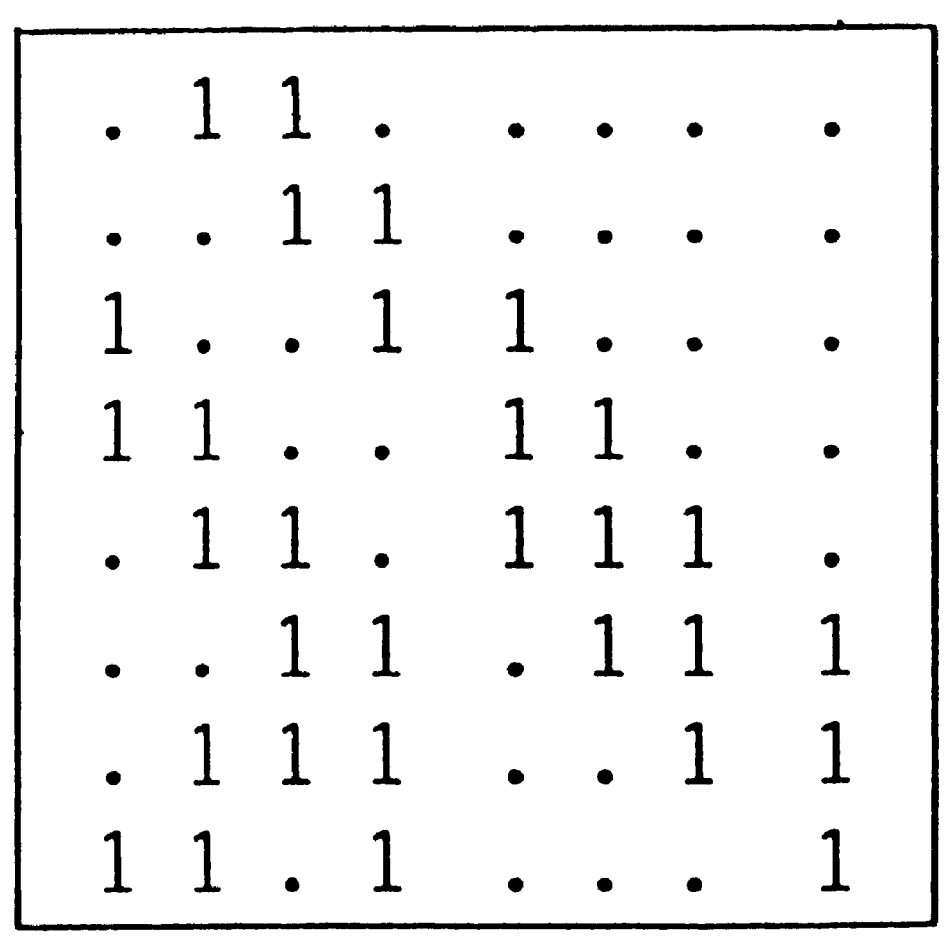
Figure 13:
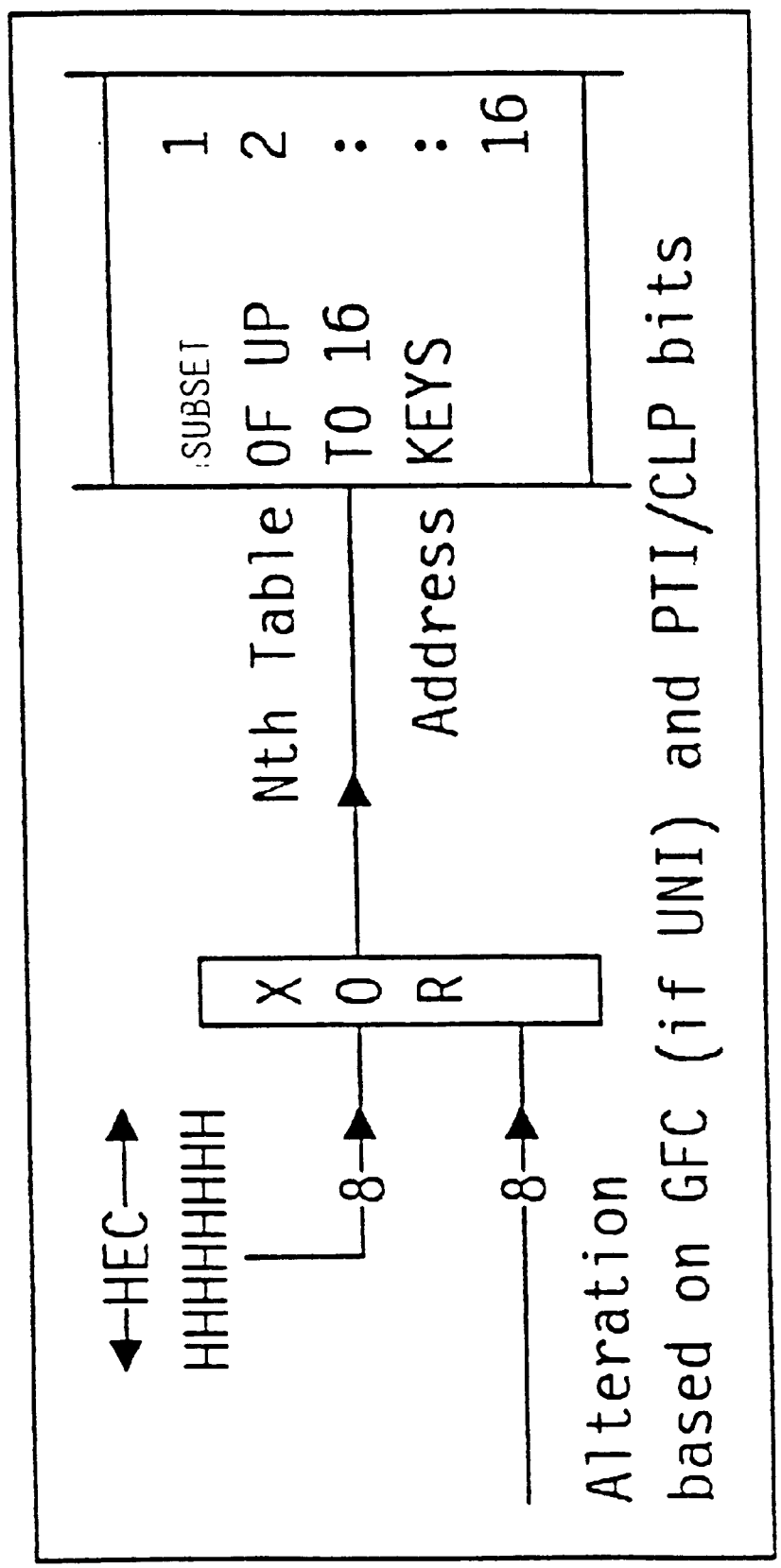
FIG. 13 shows the alteration of the HEC forming the hash key for ATM.

When using the ATM cell header HEC as for CRC-8, one correction must be made because CRC-8 of the CPI/VCI fields is not quite identical to the HEC cell header. The HEC is not used directly as the hash key for implementing the searching function of the invention when used in the 'ATM forwarding' layer implemented in ATM adapters. As a matter of fact, the HEC is not exactly the CRC-8 of the VPI/VCI fields. The HEC is the CRC-8 calculated on 40 bits, the first 32 bits of ATM header completed with 8 zeros. The first 32 bits of the ATM cell header are described in the I.361 T-ITU recommendation. They comprise not only the VPI/VCI fields but also depending on the type of connections (UNI/NNI), the GFC/PTI/CLP fields. As the hash key must represent the CRC-8 applied to the VPI/VCI fields only, when using the HEC which is the CRC-8 calculated on all the fields of the header, it is necessary to alter the HEC to suppress the effect of the GFC/PTI/CLP fields. One way to do it is to implement the logical operation represented by a multiplication of the HEC by the matrix of FIG. 12. Persons familiar with logical operations know that such a 8×8 matrical operation when applied to the 8 bit HEC field masks the non VPI/VCI field. The result of matrical multiplication is then XORed with the HEC value to obtain the altered HEC to be directly used as a hash key. This alteration of the ATM header HEC is illustrated in FIG. 13. The HEC is represented with the 8 H bits. The 8 bit result of the matrical operation and the 8 bit HEC are the two inputs of the 2-way XOR logical operation, the result being the hash key which is used for pointing to one of the 256 entries stored in the VPI/VCI addresses table.

Insertion and deletion of entries in the table storing all the VPI/VCI addresses are simple when using the searching method of the invention. Because the search method of the invention is a linear probing method, the data can be perfectly scattered in subsets having a limited size; as an example, the VCI/VPI fields are split into 256 subsets of 16 entries each when choosing the CRC-8 as hash key and a total VPI/VCI field length of 12 (see table of FIG. 6). Coming back to the management of the table entries where the searches are performed, adding a new key will consist of reserving an entry by setting two-bit indicator to Active state in the first unused space read. Deleting an entry consists of setting the two bit indication of the corresponding entry to a Void state. A voided entry can later be reused and reset to Active. At table initialization, the two bit indicator for each of the entries is set to an Empty state. These management operations always imply a limited number of reading operations as the subset in each pointed entry is limited. This guarantees full performance operation.

Figure 9:
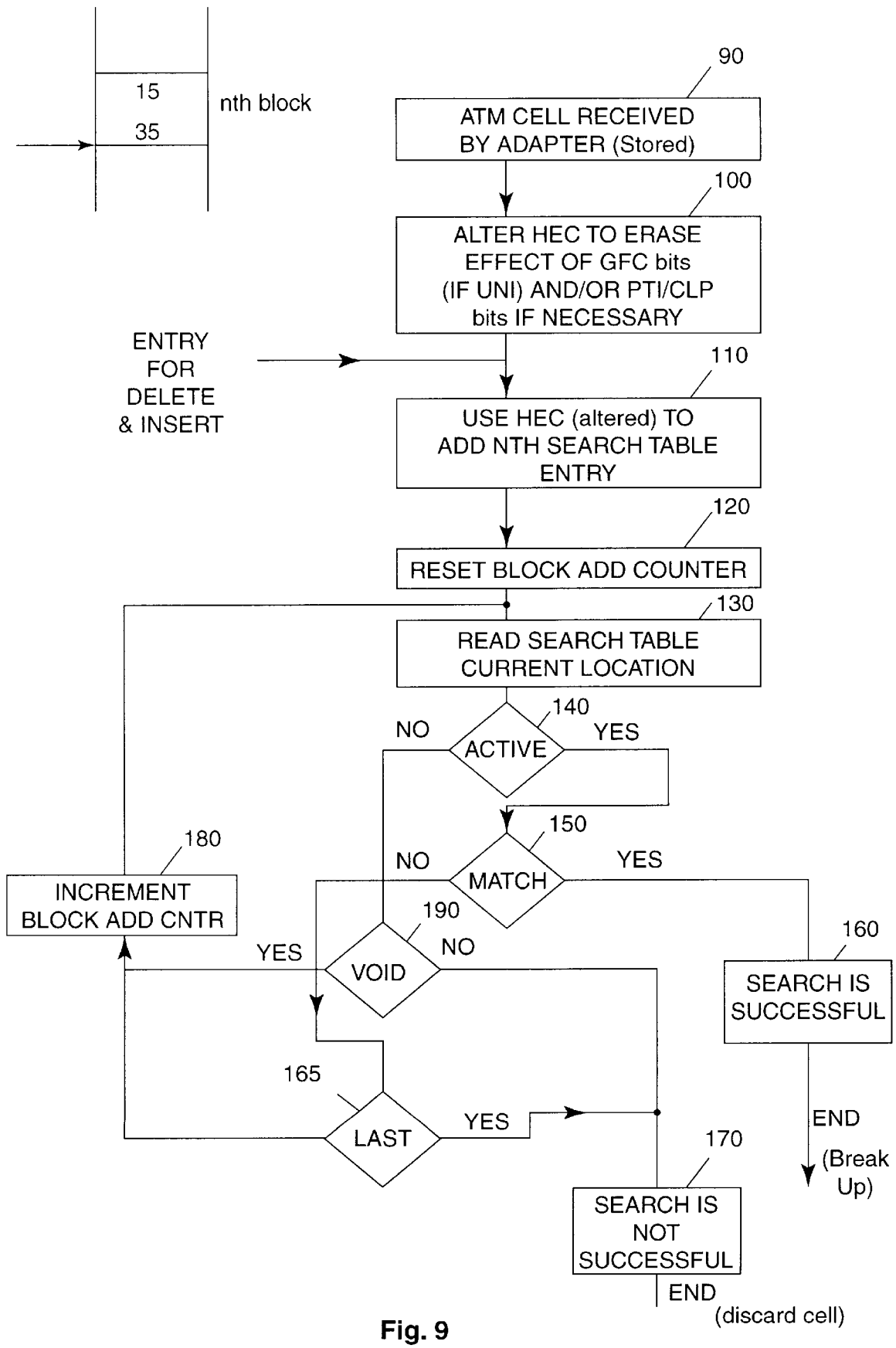
FIG. 9 is a flow chart of the SEARCH process.

FIG. 9 goes through the steps of a search operation for the case of a direct use of the HEC byte. Whenever a cell is received from the line it must temporarily be stored (90) so the 5 byte header is available for inspection. Before the HEC can be used to address the hash table it must be altered to erase the effect of the 4 GFC bits (if UNI) and of the PTI/CLP bits if different from 0. Block 100 performs the necessary alterations of incoming HEC after which the 8-bit field is used to address a 256-entry table as shown in 110. The block address counter (120) used to scan the inputs made at this particular table entry by the network manager is reset in order that the scanning starts with the first input. Then, a read of the corresponding table location is done (130). The bit code field of the current table entry is checked by comparator 140. If found "active" the VPI/VCI field stored at the current table address is compared (150) to the VPI/VCI field of the incoming cell (90). If a match is found the search operation ends successfully in 160 where VPI/VCI swapping takes place. If fields do not match, the current block address value is compared in 165 to the fixed last block address value (e.g. 16). If the last address of the block has been reached without finding any match between the stored VPI/VCI and the incoming cell VPI/VCI then search ends unsuccessfully in 170. At this point the cell is discarded and an appropriate error report is made to the network manager. If the block address is not yet reached, the process goes on with the incrementing of the current address in 180. The process then resumes at step 130 with a reading of a next table location. Going back to step 140 if the current location was not "active", further testing of the 2-bit code bits is done in 190. If a "void" code is found (indicating a deleted entry), and must be skipped, an increment of the current block address is also done in 180 as above. From 190, if a "void" code is not found then the corresponding table entry must be "empty" in which case the SEARCH unsuccessfully terminates in 170.

Figure 10:
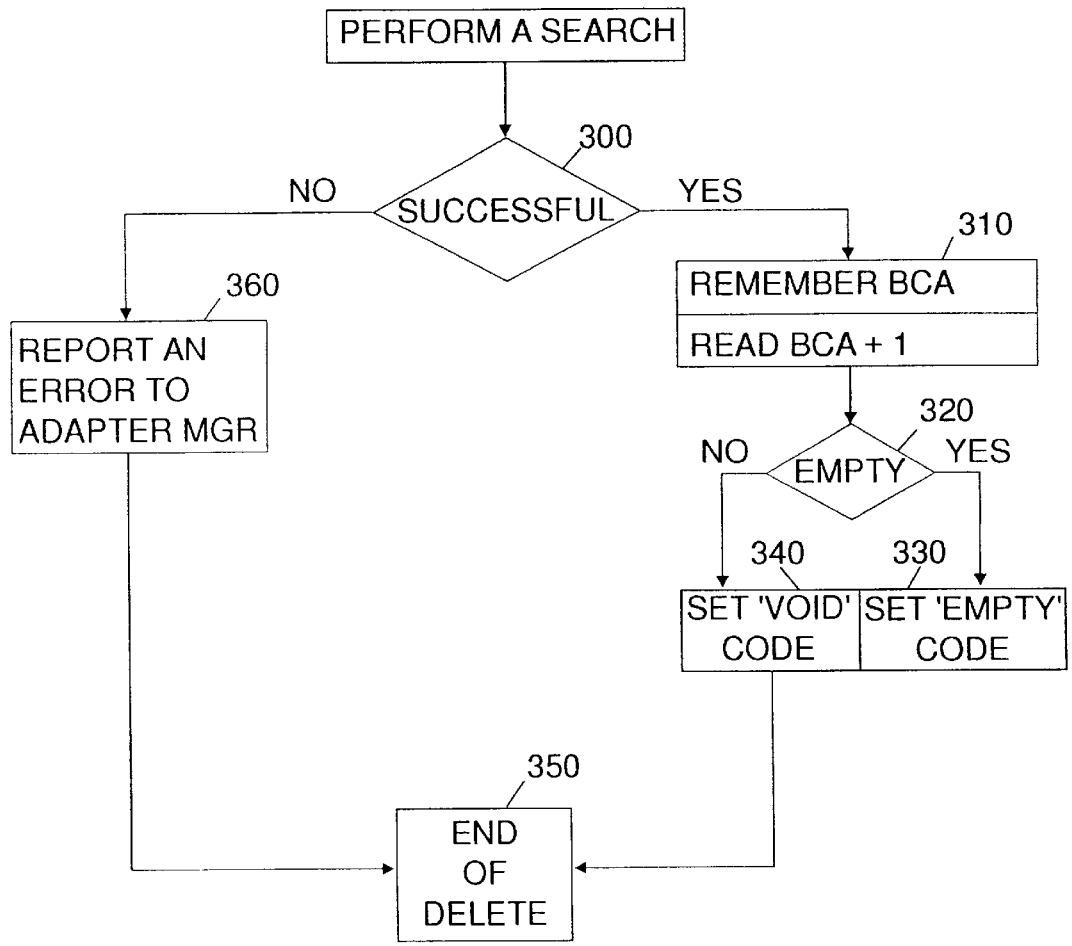
FIG. 10 is a flow chart of the DELETE process.

FIG. 10 describes the steps of a delete which must preceded by a SEARCH described in FIG. 9. The first two steps (90 and 100) of the SEARCH are skipped since there is no need to alter the HEC because the corresponding table entry is supplied directly from network manager inputs to the adapter card. To actually perform a DELETE, the SEARCH must have been first successful, which is tested in 300. If the SEARCH was successful, the current block current address (BCA) at which a "match" has occurred in FIG. 9 must be preserved to trigger the reading of the next (n+1) table location in 310. The 2-bit code of the next location is tested. If found "empty" by comparison 320, the current block address must be set with an "empty" code in 330 so that the next block scan will terminate at this location. If the result of the test in 320 is that the next location is NOT empty, then a "void" code must be set in 340 so that the next block scan will not terminate at this location. At this point the delete ends successfully in 350. Back to step 300 if the SEARCH was unsuccessful then an error must be reported in 360. Delete ends however in 350. It is network manager responsibility to decide how to proceed for this type of event (attempt to delete a nonexisting connection).

Figure 11:
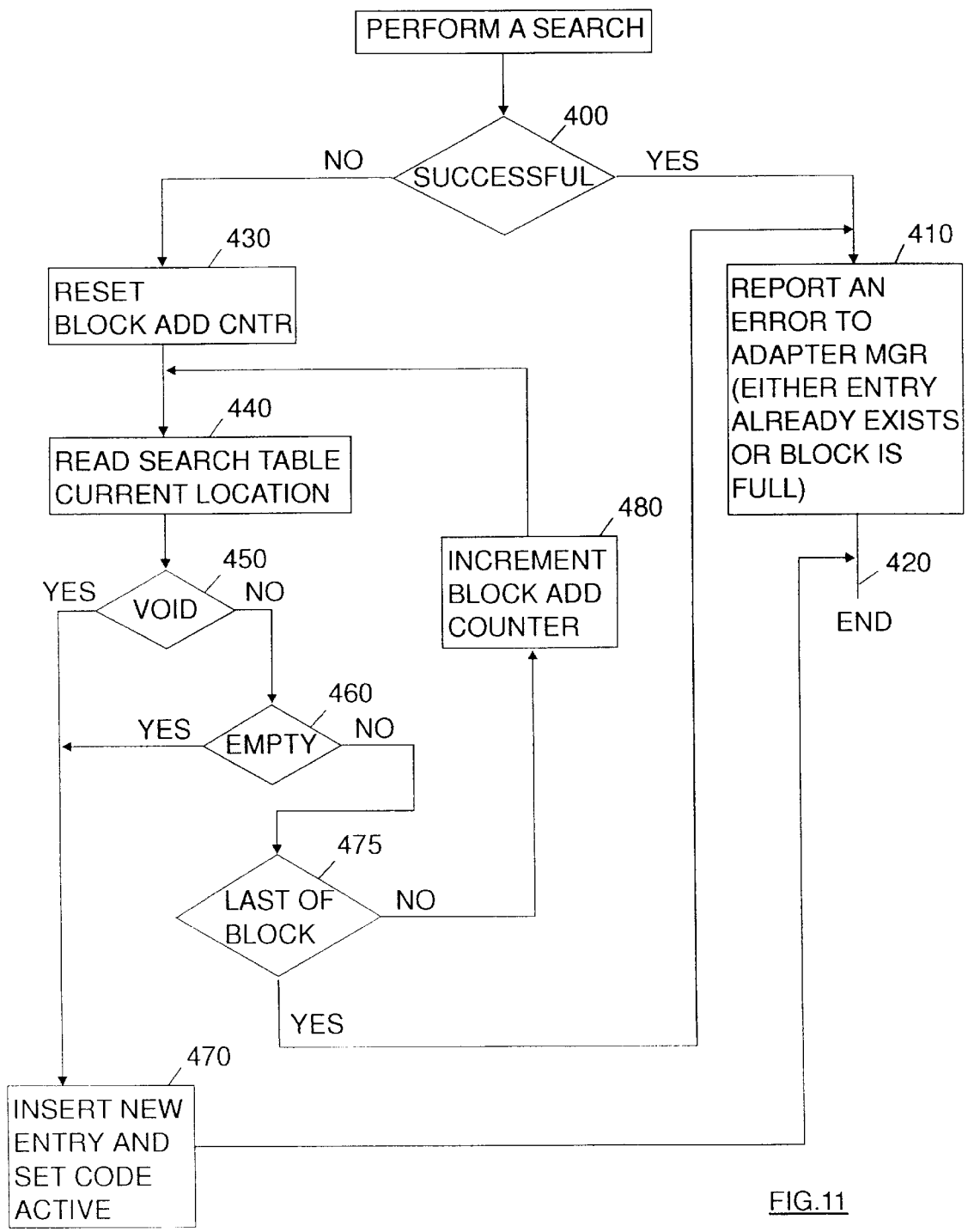
FIG. 11 is a flow chart of the INSERT process.

FIG. 11 describes the process of adding a new entry to the table to define a new connection. As with a DELETE, an INSERT operation starts with a SEARCH described in FIG. 9. The search should not normally be successful as reported by test 400. If, however, it is successful, a report must be made in step 410 to network manager that an attempt is being made to insert an already existing connection. For such an error condition, the process ends unsuccessfully in 420. If, as is normally expected, the SEARCH is unsuccessful, a re-reading of the current block must be initialized by resetting the block address counter in 430. The current location is then read in 440 and the 2-bit code tested in 450. If a "void" location is found at step 450 or an "empty" location is detected at next test 460 then, an insertion of the new input can be performed in step 470 at the current location. This also assumes that the 2-bit code is set to the "active" mode. If, back to test 460, the result is that the current location is neither "void" nor "empty" as tested in 450 then the next step is to test for the last location of the current block (475). If the last location has been reached, no room is left for the new entry. This is an error case which must be reported as indicated in 410. If the last block address has not been reached the block address counter must be incremented in 480 after which the process resumes at step 440. The above looping process is repeated until a location is found for the new entry or an error is detected. As soon as an entry has been inserted in 470, the insert process ends in 420.

According to the algorithms just described, the length of one entry of the search table for VPI/VCI bit fields could be, for instance, of 42 bits in the case where the search method supports a total number of simultaneous connections of 4096, spread on a VPI/VCI bit field of 12 bits. The format would be as follows: 2 state bits (00 EMPTY, 01 VOID, 1× ACTIVE); a maximum of 12 bits for the VPI field, 16 bits for the VCI bits and final value stored which could be a 12 bit pointer allowing 4096 combinations. An alternate solution consists of storing the new VPI/VCI field which will replace the current one, instead of the 12 bit pointer. In the cell forwarder of an ATM adapter implementing the alternate search method of the invention, each table entry would also contain the switch tag to be attached to the cells in order to direct them to the correct output port through the switch.

Figure 17:
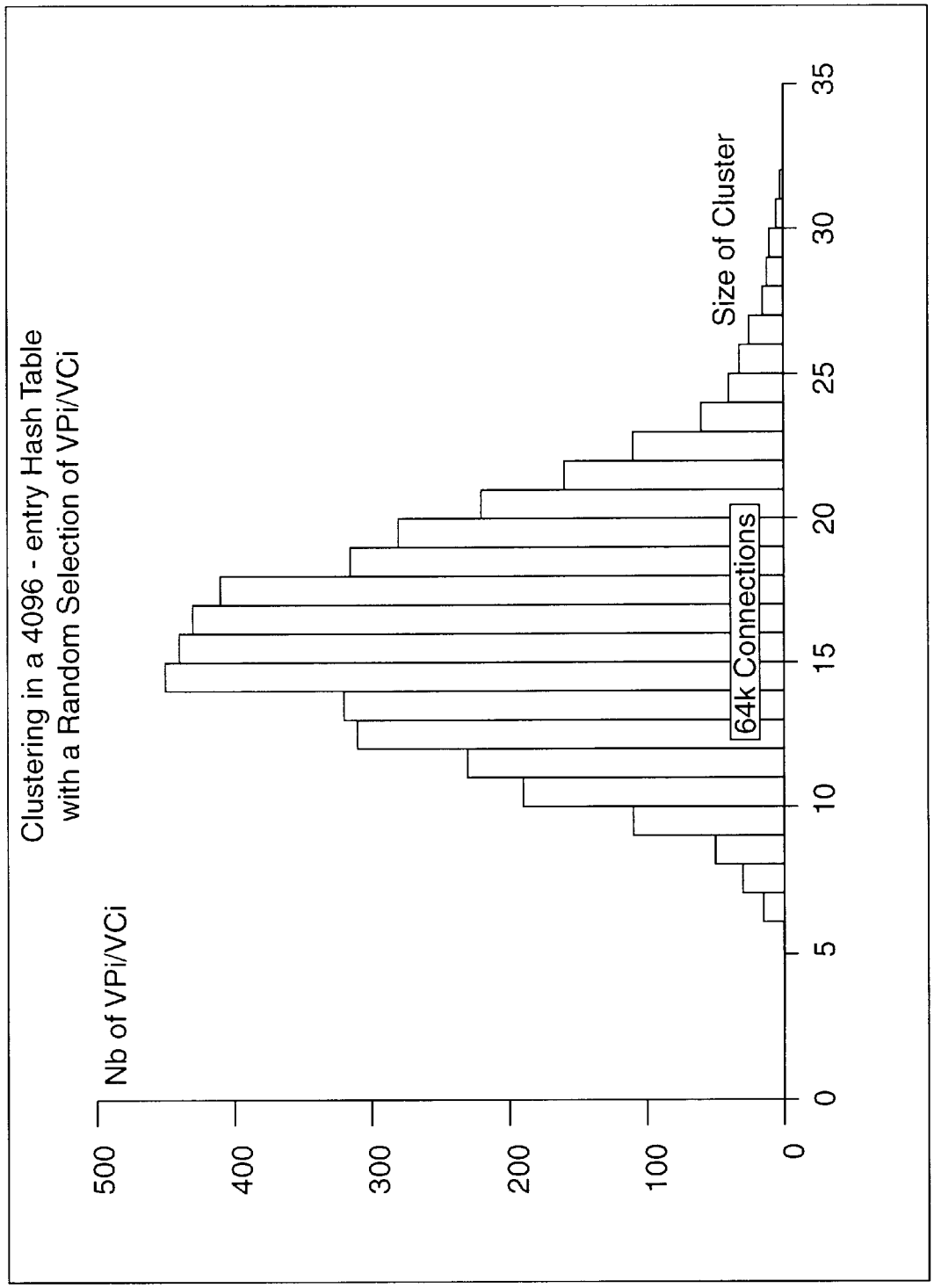
FIG. 17 is the histogram representing the spread of data clustering for a random selection of VPI/VCI combinations.

FIG. 17 illustrates the spreading of data cluster size found for 64k VPI/VCI randomly selected combinations when using CRC-12 as hash key in a 4096 ($2^{12}$) entry table. One can see that the maximum cluster size observed is 32 while the average is 16 which is consistent with the results of the table in FIG. 15, column 16. This suggests that in a statistical approach in which the I.361 recommendation cannot be strictly followed, it would only be necessary to foresee a subset twice as large as it is necessary if I.361 recommendation is met. This extension generalizes the application of the searching method of the invention.

The implementation of the table searched can be done in a generally-available RAM storage unit. Compared to the CAM or the 'pseudo-CAM' of the prior art, the storage is reduced. In an implementation of the invention in software or specific hardware, only logical operations are required. These are simpler and thus cheaper to implement compared to the prior art. The processing time is low enough to sustain at least 155 Mbps and 622 Mbps media speed links in the ATM adapters implementing the searching function of the invention in the cell forwarder of the ATM layer.

While there have been described what are considered to be preferred embodiments of the invention, variations and modifications in the described embodiments may occur to those skilled in the art once they learn of the preferred embodiment. It is intended that the appended claims shall be construed to include the preferred embodiments and all such variations and modifications as fall within the true spirit and scope of the invention.

What is claimed is:

1. A method for searching a N bit field address, N being an integer greater than zero, said N bit field address comprising no more than two contiguous bit sub-fields whose cumulative length is an integer L, said method being characterized in that it compises the following steps:

choosing three integers n, m and p, n being an integer greater than zero, m being an integer and p being an integer equal or greater than 4 and L=n+m+p, reading the N bit field address, computing a remainder of a polynomial division of a polynomial representation of said N bit field, the polynomial coefficients being zero or one, by a multiplying group polynomial generator of degree n, choosing as a hash key the computed remainder bit field and m bits of the N bit field, pointing to a first address corresponding to said hash key, among $2^{m+n}$ addresses, reading sequentially the next $2^p$ entries until the content of the address read matches the N bit field address.

2. The method of claim 1 characterized in that the two contiguous bit field start from the least significant bits.

3. The method of claims 1 or 2 characterized in that L=12, n=8, p=4, m=0 and the polynomial generator is $G(x)=X^8+X^2+X+1$.

4. The method of claims 1 or 2 characterized in that L=16, n=8, p=4, m=4 and the polynomial generator is $G(x)=X^8+X^2+X+1$.

5. The method of claims 1 or 2 characterized in that L=13, n=8, p=5, m=0 and the polynomial generator is $G(x)=X^8+X^2+X+1$.

6. The method of claims 1 or 2 characterized in that L=16, n=12, p=4, m=0 and the polynomial generator is $G(16533)=X^{12}+X^{11}+X^{10}+X^8+X^6+X^4+X^3+X+1$.

7. A method for searching the VPI/VCI bit fields of an ATM cell header, said method comprising the following steps:

a. —choosing two integers m and p, p being equal or greater than 4, b. —reading the VPI/VCI N bit field c. —reading the HEC of the ATM header, d. —computing a remainder of a modulo 2 polynomial division by a polynomial generator $G(x)=X^8+X^2+X+1$ of a polynomial representation of the non VPI/VCI bits of the 32 first bits of the ATM cell header, e. —XORing the result of step d with the HEC read in step c, f. —choosing as a hash key the result of step e and m significant bits of the N bit field, g. —pointing to a first address corresponding to the key computed in step f, h. —reading sequentially the next $2^p$ entries until the content of the address read matches the N bit field.

8. An apparatus for searching the VPI/VCI bit fields of an ATM cell header comprising:

a. storage for storing searched VPI/VCI fields b. means for selecting integer values m and p, p being equal to or greater than 4, c. means for reading at least N bits of the VPI/VCI bit field and the HEC of the ATM cell header, d. means for computing a remainder of a modulo 2 polynomial division of a polynomial representation of the non VPI/VCI bits of the first 32 bits of the ATM cell header by a polynomial generator $G(x)=X^8+X^2+X+1$, e. logic for performing an exclusive OR of the result of step d) with the HEC of the ATM cell header, f. a hash key generator for generating hash key from a combination of the results of step e and m significant bits of the VPI/VCI field, g. addressing means for pointing to a first address corresponding the generated hash key, and h. a memory read means for sequentially reading the next $2^p$ entries until the content of the address read matches the N bits of the VPI/VCI field.

* * * * *